United States Patent [19]

Arino et al.

[11] Patent Number: 4,726,189
[45] Date of Patent: Feb. 23, 1988

[54] BRAKE BOOSTER

[75] Inventors: Masao Arino, Higashimatsuyama; Michio Kobayashi, Kawajima, both of Japan

[73] Assignee: Jidosha Kiki Co., Ltd., Tokyo, Japan

[21] Appl. No.: 898,065

[22] Filed: Aug. 19, 1986

[30] Foreign Application Priority Data

Sep. 30, 1985 [JP] Japan ............................ 60-149498[U]

[51] Int. Cl.⁴ ............................................... B60T 13/46
[52] U.S. Cl. ........................................ 60/547.1; 92/169
[58] Field of Search ................. 60/547.1; 92/128, 169; 411/171, 376

[56] References Cited

U.S. PATENT DOCUMENTS 4,466,246  8/1984  Furuta et al. ...................... 60/547.1
4,583,366  4/1986  Tsubouchi ............................ 60/547.1

FOREIGN PATENT DOCUMENTS 60-17402   3/1980  Japan .
   99450   6/1982  Japan ................................. 60/547.1
2085105B   7/1984  United Kingdom .

Primary Examiner—Alan Cohan
Attorney, Agent, or Firm—Flynn, Thiel, Boutell & Tanis

[57] ABSTRACT

A brake booster, in particular, a construction for strengthening the coupling between the brake booster and a master cylinder, is disclosed. A strengthening plate is interposed between the head of a bolt extending through an enclosed shell and the inner surface of the shell and the bolt head is ring projection welded to the strengthening plate, which is in turn projection welded to the shell while maintaining a hermetic seal therebetween at a location outside of the welding location of the bolt.

6 Claims, 4 Drawing Figures

BRAKE BOOSTER

BACKGROUND OF THE INVENTION

The invention relates to a brake booster, in particular, to the construction of coupling thereof with a master cylinder.

A brake booster includes a diaphragm disposed within an enclosed shell to divide the interior thereof into a plurality of pressure chambers to produce a pressure differential therebetween which is effective to move a power piston back and forth, thereby producing a booster action. To meet the requirement for a reduced weight of a vehicle, the weight of the brake booster is also reduced, by reducing the sheet thickness of the shell. However, the reduced wall thickness of the shell presents a problem in respect of a degraded strength. As is well known, a master cylinder is secured to the brake booster at the front side of the shell by means of mounting bolts. Tension of an increased magnitude is applied to the mounting bolts during operation of the booster, presenting a problem in respect of the strength of the mounting area.

To solve the problem, a variety of boosters have been proposed which attempt to increase the strength of the mounting bolt area by the provision of a strengthening plate, as disclosed in (1) Japanese Utility Model Publication No. 17,402/1985, (2) Japanese Laid-Open Patent Application No. 99,450/1982 and (3) Japanese Laid-Open Utility Model Applicaton No. 63,769/1982.

In the first proposal the strengthening plate is not welded to the shell, and hence cannot exhibit a satisfactory strengthening function. In the second proposal, projection rings at two locations have an equal diameter and are welded simultaneously, resulting in a failure to assure a uniform welding quality. In addition, the reduced diameter of the rings fails to provide a sufficient strengthening effect. In the third proposal, a spot welding is employed, which is subject to a stress concentration in the region of the spot welding. All of the described proposals have defects in one or other respects.

SUMMARY OF THE INVENTION

It is an object of the invention to provide a brake booster which enhances the strengthening effect afforded by a strengthening plate. The above object is accomplished by ring projection welding the head of a bolt to a strengthening plate, which is in turn projection welded to a shell at a location surrounding the bolt welding position while maintaining a hermetic seal between the shell and the strengthening plate.

DESCRIPTION OF EMBODIMENT

Figure 1:
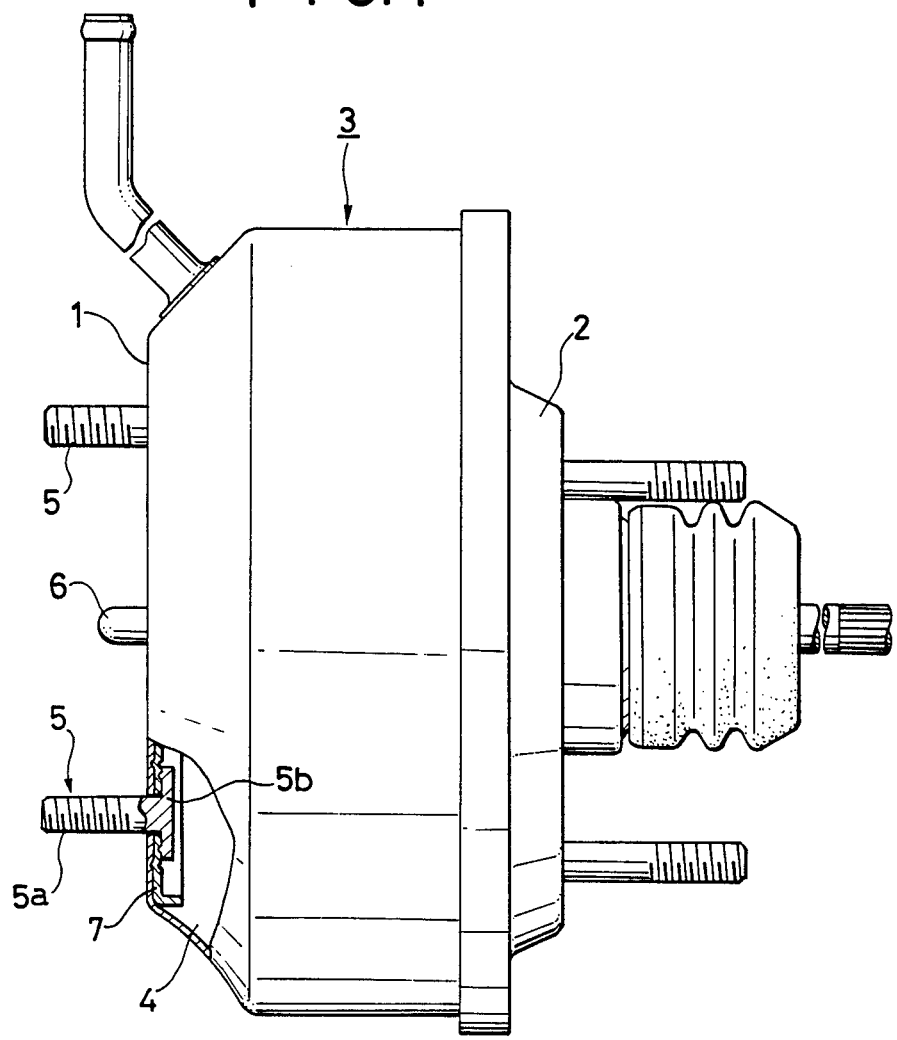
FIG. 1 is a side elevation, partly in section, of a brake booster according to one embodiment of the invention.

Referring to the drawings, an embodiment of the invention will be described. FIG. 1 shows a brake booster according to one embodiment of the invention in side elevation, partly in section, and a portion thereof is shown in enlarged section in FIG. 2. Referring to these Figures, a combination of a front shell 1 and a rear shell 2 defines an enclosed shell 3. While the interior of the enclosed shell 3 is not shown in detail, it will be seen that the interior is divided by a combination of a power piston and a diaphragm into a forwardly located, negative pressure chamber 4 and a rearwardly located, atmospheric chamber. By utilizing a conventional valve mechanism (not shown), the communication between the negative pressure chamber 4 and the atmospheric chamber or the communication between the atmospheric chamber and the atmosphere is controlled to produce a pressure differential between the both chambers to provide a booster action.

A master cylinder, not shown, is secured to the front end face of the enclosed shell 3 by means of a plurality of mounting bolts 5 for transmitting an output from the booster to the master cylinder through a push rod 6 which hermetically extends through the center of the end wall of the front shell 1.

Figure 2:
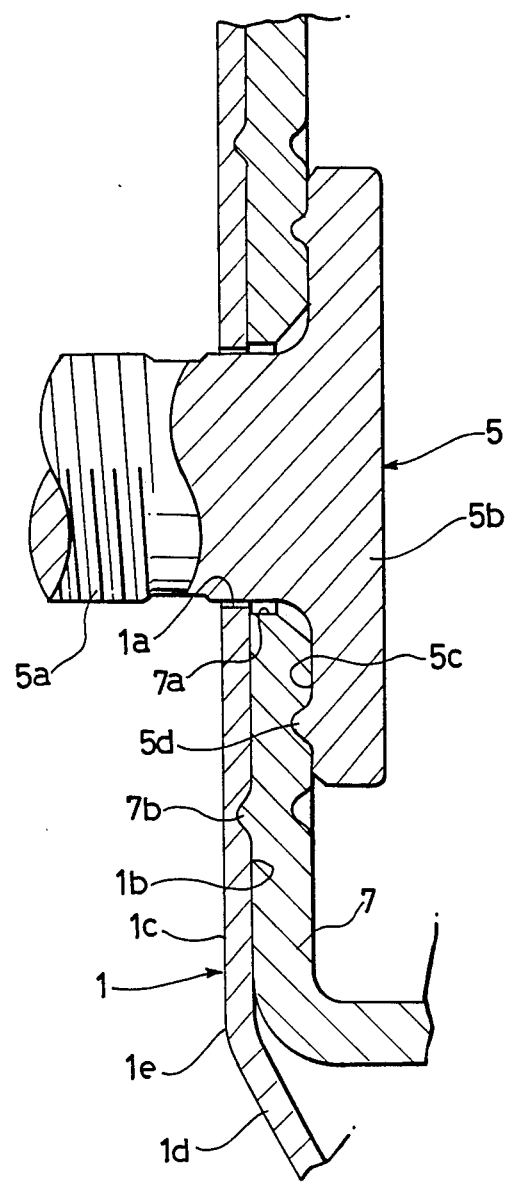
FIG. 2 is an enlarged section of part of the arrangement shown in FIG. 1.
Figure 3A:
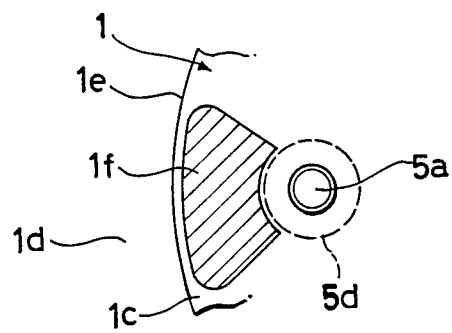
FIG. 3(a) is an illustration of a stress concentration around a mounting bolt.
Figure 3B:
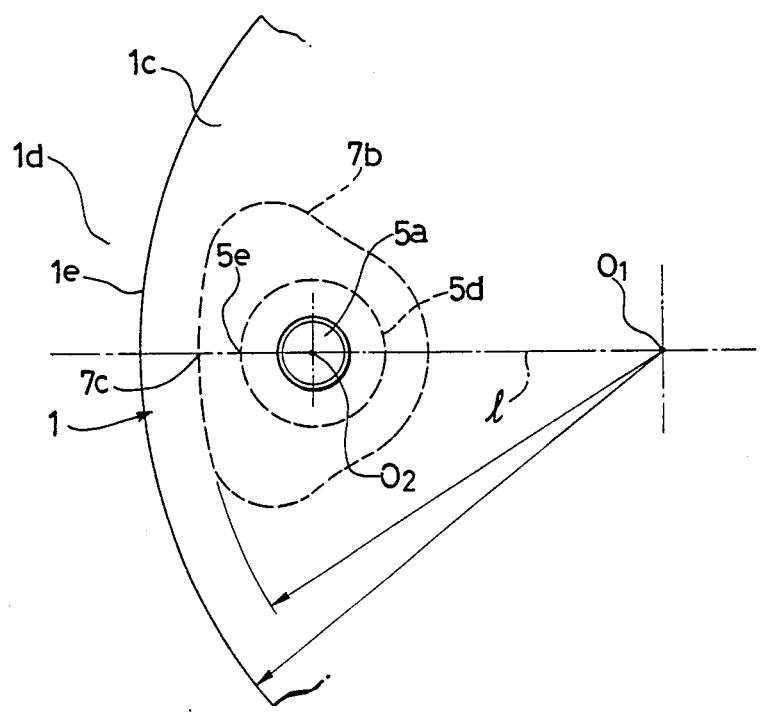
FIG. 3(b) is an illustration of a mounting bolt and one form of projection on a strengthening plate.

The construction of the coupling between the brake booster and the master cylinder will now be described with reference to FIGS. 1 and 2. Both the front shell 1 and a strengthening plate 7 are formed with openings 1a, 7a, respectively, which permit the shank 5a of a mounting bolt to extend therethrough. The mounting bolt 5 is placed so that its shank 5a extends externally of the enclosed shell 3 while the strengthening plate 7 is held between the internal surface 1b of the front shell and an end face 5c of the head 5b of the bolt, which is located nearer the shank thereof. It will be seen that the end face 5c of the bolt head is formed with an annular projection 5d, which permits the bolt head to be projection welded to the strengthening plate 7 while maintaining a hermetic seal therebetween. The strengthening plate 7 is formed with an annular or non-annular projection 7b at a location where it surrounds the welding location of the mounting bolt 5, permitting the strengthening plate to be projection welded to the inner surface 1b of the front shell 1 while maintaining a hermetic seal therebetween. In this manner by projection welding the strengthening plate 7 to the front shell 1 while maintaining a hermetic seal therebetween at a location which surrounds the projection welding of the mounting bolt 5 to the strengthening plate 7, any location of stress concentrations which may be developed outside the welding location of the mounting bolt 5 can be effectively strengthened. Accordingly, the wall thickness of the shell 3 and the strengthening plate 7 may be further reduced, enabling a further reduction in the weight of the booster. In addition, the welding area of the mounting bolt 5 which is situated facing the strengthening plate 7 is maintained flat during the welding operation, in contrast to the arrangement in the second proposal referred to above, thus bringing forth an advantage that the welding quality is stabilized.

Where the projection 7b on the strengthening plate 7 is non-circular, the configuration of such projection can be varied in a variety of ways, thereby effectively strengthening the locations of stress concentration. Location around the mounting bolt 5 where stress concentration is most likely to occur is a fan-shaped area 1f, shown hatched in FIG. 3(a), which is located outside the location 5d of the projection welding of the mounting bolt 5 and which extends along a boundary 1e (see FIG. 2) between the flat front end face 1c and an inclined surface 1d of the front shell 1. Accordingly, for puspose of stress relief, the projection 7d on the strengthening plate 7 is most preferably disposed on a concentric circle with the boundary 1e of the front shell and extending substantially through the center 7c between the outer periphery 5e of the welding location 5d of the mounting bolt 5 and the boundary 1e of the front shell 1 on a line l joining the center $O_1$ of the front shell 1 and the center $O_2$ of the mounting bolt 5 as shown in FIG. 3(b).

While the invention has been shown and described above in connection with an embodiment thereof, it should be understood that a number of changes, substitutions and modifications will readily occur to one skilled in the art without departing from the spirit and scope of the invention.

What is claimed is:

1. A brake booster including an enclosed shell, the interior of which is divided into a plurality of pressure chambers, mounting bolts extending through the front end face of the shell and being coupled to a master cylinder with a strengthening plate interposed between the head of the bolt and the inner surface of the shell; the bolt head having a ring projection welded to the strengthening plate, the strengthening plate having a projection facing said shell, said projection extending along a closed path continuously offset radially outboard of the welding location of said bolt, the strengthening plate projection being in turn continuously projection welded to the shell and therewith maintaining a hermetic seal between the strengthening plate and shell at a location spaced radially outside of the welding location of the bolt.

2. A brake booster according to claim 1 in which the strengthening plate is projection welded to the shell along a circular path.

3. A brake booster according to claim 1 in which the strengthening plate is projection welded to the shell along a non-circular continuous path.

4. A brake booster according to claim 3 in which the strengthening plate is projection welded to the shell in a substantially fan-shaped area which is enlarged toward the periphery of the shell.

5. A brake booster according to claim 4 in which the strengthening plate is projection welded to the shell at least along a line which forms a concentric circle with the boundary between a flat, front end face of the shell and an inclined surface surrounding the flat end face.

6. A brake booster according to claim 5 in which the concentric circle extends substantially through the center between a point on the mounting bolt which is located nearer the outer periphery of the welding location of the bolt and the boundary on a line joining the center of the front end face of the shell and the center of the mounting bolt.

* * * * *